United States Patent [19]

Jadamus et al.

[11] Patent Number: 4,835,063

[45] Date of Patent: May 30, 1989

[54] PARTS BASED ON POLYPHENYLENE ETHERS AND RUBBERS AS WELL AS METHODS FOR THEIR PRODUCTION

[75] Inventors: Hans Jadamus, Marl; Guenter Beckmann, Haltern; Roland Streck, Marl; Klaus-Peter Richter, Marl; Wolfgang Schafer, Marl, all of Fed. Rep. of Germany

[73] Assignee: Hüls Aktiengesellschaft, Marl, Fed. Rep. of Germany

[21] Appl. No.: 104,943

[22] Filed: Oct. 6, 1987

[30] Foreign Application Priority Data

Oct. 25, 1986 [DE] Fed. Rep. of Germany ....... 3636349

[51] Int. Cl.$^4$ .................. B32B 25/08; B32B 25/12
[52] U.S. Cl. .................... 428/495; 428/519; 428/521; 428/492; 525/133; 525/152
[58] Field of Search ............... 525/133, 152; 428/407, 428/76, 492, 495, 521

[56] References Cited

U.S. PATENT DOCUMENTS 4,294,732 10/1981 Ohyachi et al. .................. 525/133
4,309,513 1/1982 Ueno et al. ...................... 525/152
4,624,874 11/1986 Schutze .......................... 428/76

OTHER PUBLICATIONS

4371688 Feb. 1, 1983, Ikeda et al. 525/133.
4300970 Nov. 17, 1981, Honda et al. 428/492.

Primary Examiner—George F. Lesmes
Assistant Examiner—A. Harbin
Attorney, Agent, or Firm—Oblon, Fisher, Spivak, McClelland & Maier

[57] ABSTRACT

Composite parts of firmly bonded molding materials, comprising a thermoplastic material containing polyphenylene ether, a layer of SBR or SBS rubber or a mixture thereof surrounding the thermoplastic material, if necessary, an intermediate layer comprising a powdered SBR rubber which may contain a filler, and a rubber containing carbon-carbon double bonds covulcanized with the layer of SBR or SBS rubber. The invention also provides a method for producing the composite part comprising treating the thermoplastic material with a solution of a SBR or SBS rubber in an organic solvent or with an aqueous latex of the rubber, if necessary, completely or partially removing the organic solvent or water, if necessary, treating the dried mass with a powdered SBR rubber which may contain a filler, and covulcanizing with a rubber containing carbon-carbon double bonds.

8 Claims, No Drawings

PARTS BASED ON POLYPHENYLENE ETHERS AND RUBBERS AS WELL AS METHODS FOR THEIR PRODUCTION

BACKGROUND OF THE INVENTION

1. Field of the Invention

The invention concerns parts made from thermoplastics which contain polyphenylene ether (PPE) and from rubber, as well as methods for their production.

2. Discussion of the Background

It is known from DE-OS No. 36 02 705 that parts which are supposed to demonstrate both high strength and rubber elasticity can be produced by covulcanization of thermoplastics which contain PPE and rubbers which contain double bonds. The method has the great advantage that a strong bond is created between the thermoplastic and the rubber within a very short period of time. In this regard, it represents a significant improvement as compared with previous methods, which either do not make a sufficiently strong bond possible or were significantly more complicated.

However, the use of this method is limited in view of the rubbers. While an SBR rubber, for example, can be covulcanized with the thermoplastic which contains PPE without restriction, there are problems with NR rubber, for example. According to the theory of DE-OS No. 36 02 705, a bond with an NR rubber can only be achieved if a mixture of NR rubber and at least 5% SBR rubber is used. This restriction is considered undesirable in practical situations. There is also an interest in achieving a bond between thermoplastics which contain PPE and pure NR rubber. But even if a mixture of 5% SBR rubber and 95% NR rubber is used, the bonding values are clearly lower than those of pure SBR rubber. Similar methods are carried out with other types of rubber. DE-OS No. 36 02 705 does not offer any indication of how one could achieve a strong bond in these problematical cases. In general, there is a need for an alternative method, in order to produce parts with a strong bond between a thermoplastic which contains PPE and any desired rubber.

SUMMARY OF THE INVENTION

Accordingly, one object of the present invention is to provide a composite part which has both high strength and rubber elasticity.

Another object of the invention is to provide a composite part containing PPE and rubber which can be produced from any rubber having carbon-carbon double bonds.

A further object of the invention is to provide a composite part in which the PPE and rubber are held together by a strong bond.

These and other objects which will become apparent from the following specification have been achieved by the composite part of the present invention which comprises:

(A) a thermoplastic material comprising polyphenylene ether, (B) a layer of SBR or SBS rubber or a mixture thereof surrounding the thermoplastic material; and (D) a rubber containing carbon-carbon double bonds, wherein the rubber is covulcanized with the layer of SBR or SBS rubber.

The invention also provides a method of producing the composite parts noted above.

DETAILED DESCRIPTION OF THE PREFERRED EMBODIMENTS

Surprisingly, parts have now been found which allow a strong bond between a thermoplastic which contains PPE and any desired rubber which contains double bonds.

These parts consist of the following components:

A. a thermoplastic which contains PPE

B. a layer of an SBR and/or SBS rubber which surrounds the thermoplastic

C. if necessary, an intermediate layer based on a powdered SBR rubber which contains filler, and D. any desired rubber which contains double bonds.

The invention also includes a method for the production of these parts. This method consists of treating component A with the solution of Component B in an organic solvent or with the aqueous dispersion of component B (rubber latex), then completely or partially removing the solvent or water, if necessary, and covulcanizing the mass obtained with component D, in the presence of a vulcanizer. Preferred rubber solvents are aliphatic and cycloaliphatic hydrocarbons, as well as unsaturated, non-aromatic and cyclic unsaturated but non-aromatic hydrocarbons. The rubber solution can also contain a vulcanizer. It is also possible to treat the mass obtained after treatment with the rubber solution with a powdered SBR rubber which contains filler, and to covulcanize it with component D only after this step.

The components according to the invention are characterized by the following advantages:

1. As the rubber component, any desired rubber which contains double bonds and can be covulcanized with other rubbers can be used. The invention therefore has a very broad application. In particular, even those rubbers which would not be suitable according to DE-OS No. 36 02 705 are suitable for use in the present invention.

2. The components can be produced in only a few minutes.

3. Outstanding adhesion between the thermoplastic which contains PPE and the rubber is achieved.

The thermoplastic which contains PPE is either pure PPE itself or a mixture of PPE with polyalkylenes, styrene polymerizates, and/or other known additives and/or reinforcers. The proportion of PPE in the thermoplastic should be at least 50 percent by weight.

Polyphenylene ethers which can be used are polymers based on substituted phenols with the general formula

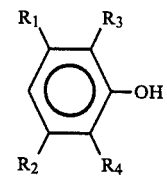

in which $R_1$ and $R_2$ are, independently, a methyl group or preferably hydrogen. $R_3$ is either hydrogen and $R_4$ is a tertiary alkyl group with up to 6 carbon atoms, such as a tert-butyl group, for example, or $R_3$ and $R_4$ each stand for an n-alkyl group with up to 6 carbon atoms, independent of one another. Preferably, 2,6-dimethylphenol is used. Of course, mixtures of the monomeric phenols listed here can also be used. Poly(2,6-dimethyl-1,4-phenylene ethers) with a limit viscosity between 0.4 and 0.7 ml/g (measured in chloroform at 25° C.) are very especially preferred.

The polyphenylene ethers can be produced, for example, in the presence of complex-forming agents, such as copper bromide and morpholine, from 2,6-dimethylphenol (see DE-OS No. 32 24 692 and OS No. 32 24 691). They are usually used in the form of a powder or granulate.

The polyalkenylenes are produced by ring-opening or ring-expanding polymerization of cycloalkenes (see K. J. Ivin, T. Saegusa, "Ring-opening Polymerisation, Vol. 1, Elsevier Appl. Sci. Publishers, London, particularly pages 121 to 183 (1984)).

Polyoctenylenes are preferred (See A. Draxler, Kautschuk+Gummi, Kunststoff, 1981, pages 185 to 190). Polyoctenylenes with different proportions of cis and trans double bonds as well as different J values and accordingly different molecular weights can be obtained according to methods known from the literature. Polyoctenylenes with a viscosity number from 50 to 350 ml/g, preferably 80 to 160 ml/g, determined in an 0.1% solution in toluene, are preferred. 55 to 95%, preferably 75 to 85% of its double bonds are present in the trans form.

Molding materials based on polyphenylene ethers and polyoctenylenes are described in the German patent applications Nos. P 34 36 780.2 and P 34 42 273.0.

Styrene homopolymerizates and/or impact-resistant styrene polymerizates can be used as component (C). The styrene homopolymerizates are produced from styrene by radical mass or suspension polymerization, in a known manner. Their molecular weights are between 150,000 and 300,000 (see Kunststoff-Handbuch, Vol. V, Carl Hanser Verlag Munich, 1969, and Ullmanns Encyklopadie der technischen Chemie, 4th ed., Vol. 19, Verlag Chemie, Weinheim 1980).

The impact-resistant styrene polymerizates are obtained in a known manner, by polymerizing styrene solutions of poly-cis-butadiene in mass, in solution or in aqueous dispersion. With the so-called mixed methods, the styrene rubber solution is prepolymerized in mass and polymerization is finished in aqueous dispersion (see, for example, U.S. Pat. No. 2,694,692 and U.S. Pat. No. 2,862,906).

Adjustment of the particle size of the plastic phase takes place in a known manner, in the stage of prepolymerization, before the so-called phase reversal. If necessary, the adjustment can also be carried out in the presence of the known chain regulators and/or radical initiators. Details, such as the connection between the stirring velocity and the size and distribution of rubber particles in the resulting impact-resistant polymerizate, for example, are known to persons skilled in the art (see e.g. Freeguard, Brit. Polym. J., 6, 203 to 228, (1974)).

The diameter of the particles in the elastomer gel phase is usually below 10 $\mu$m, preferably below 3.5 $\mu$m. The average diameter (volume average) is in a range between 1 and 5 $\mu$m. However, this does not take the particles whose diameter is either below 0.5 $\mu$m or above 10 $\mu$m into consideration.

The average particle size (volume proportion) is determined by measuring and averaging the diameters of circles with the same area (equivalent diameter) of the particles on thin-layer electron microscopy photographs.

The distribution curve and from it, the volume average are calculated using the volumes of the particles (3rd power of the equivalent diameter). For an evaluation, at least 2,000 particles should be used.

The thermoplastic also contains additional additives, if necessary, such as stabilizers, processing agents, reinforcers, foaming agents, metal fibers, carbon black, graphite and metal flakes, titanium oxide and zinc sulfide. Suitable reinforcers are, for example, carbon fibers, aramide fibers and mineral substrates. The proportion of reinforcers in the PPE material can be up to 50%, that of flame-proofing agents up to 15% and that of all other additives in total up to 5%, relative to the thermoplastic in each case.

Particularly suitable flame-proofing agents are phosphorus compounds, such as triphenylphosphine oxide and triphenylphosphate. Also, a conventional flame-proofing agent which contains a halogen can be used. Organic compounds containing halogen, such as those described in the monography by H. Vogel "Flammenfestmachen von Kunststoff", Huthig-Verlag, 1966, on pages 94 and 106, are possible agents. But the flame-proofing agents can also be halogenated polymers, such as halogenated polyphenylene ethers (see DE-OS No. 33 34 068) or brominated oligostyrenes or polystyrenes, for example. The compounds should contain more than 30 percent by weight halogen.

In cases where flame-proofing agents containing halogen are used, it is recommended that a synergist be used. Compounds of anitmony, boron and tin are suitable. These are generally used in amounts of 0.5 to 10 percent by weight, with reference to the thermoplastic.

Suitable stabilizers include organic phosphites, such as didecylphenyl phosphite and trilauryl phosphite, sterically hindered phenols as well as derivates of tetramethyl piperidine, benzophenone and triazole, for example.

Preferably, the thermoplastic which contains PPE is produced by mixing the components in the melted state. At least one component is melted and the melt obtained is mixed with the remaining components. Another possibility is to melt all the components at the same time and to mix them.

Preferably, melting temperatures of 250° to 350° C., particularly 260° to 300° C., and melting times of 0.3 to 10 minutes, particularly 0.5 to 3 minutes, are used.

For melting and mixing, conventional equipment for handling highly viscous melts, both in batch and continuous operation, are suitable. Twin-screw extruders and coextruders are particularly suitable.

However, it is also possible to produce the thermoplastic which contains PPE in a different manner, e.g. by precipitation from the solution mixture of the components, instead of by compounding. Toluene, for example, is a suitable common solvent, methanol, for example is a suitable common precipitant. The polymer mixture can also be obtained by evaporation of the solvent, for example according to the German patent application No. P 33 37 629.8.

Component B, which surrounds the thermoplastic A in the form of a thin layer, is an SBR or SBS rubber. Here it makes no difference in what way the rubber was obtained, i.e. whether it was produced by polymerization in emulsion or solution. The SBR rubber is preferably a styrene-butadiene copolymer with a statistical structure. The SBS rubber is preferably a styrene-butadiene-styrene block copolymer.

Component C of the component is produced by covulcanization of a powdered SBR rubber which contains filler with components B and D. The grain size of the powdered rubber is preferably below 1 mm and this rubber can therefore be designated as a powder.

A powdered E-SBR rubber which contains filler is particularly preferred. There are a number of different methods for producing powdered rubbers which contain filler. Many processes are so time-consuming and complicated, however, that they have not gained any practical significance. Recently, a method which is described in DE-OS No. 28 22 148 was used for practical purposes in the industry for the first time. This method is characterized by the fact that the rubber component is combined with an aqueous filler suspension which contains a water-soluble aluminum salt and water glass. The deciding factor is that not only does the aqueous filler dispersion have to have a pH value of 3.0 to 3.7, but that when this dispersion is combined with the rubber component, an amount of mineral acid is added so that the mixture obtained also stays within the pH range.

Component D is any desired rubber which contains double bonds, as long as it can be covulcanized with the rubber components B, or, if applicable, C.

Preferably, such rubbers which cannot be vulcanized alone with a thermoplastic which contains PPE, such as NBR rubber or in particular, NR rubber are used.

The rubbers of component D may contain fillers such as carbon black or silica gel, for example, stretching agents such as mineral oils, vulcanizers such as sulfur, vulcanization accelerators and protectants against aging. A particularly suitable processing agent is polyoctenylene (A. Draxler, Kautschuk+Gummi, Kunststoffe 1983, p. 1037 to 1043). The mineral oils added can be paraffin oils, naphthene oils or aromatic oils.

The component parts can be extremely varied with regard to their structure: examples include rubber nubs on PPE plates, PPE grains in a rubber matrix, sandwich structures made of rubber and PPE, PPE fibers in rubber.

In the following, the method according to the invention is described. The solvent in which the rubber is dissolved and which is not supposed to dissolve the PPE or the thermoplastic which contains PPE, if possible, is of particular significance here. One embodiment consists of using a solvent in which PPE if very insoluble. Another embodiment consists of using a solvent which causes solvent welding of the thermoplastic at its surface. In this case, the action time of the solvent on the thermoplastic must also be taken into consideration. Because of these requirements, the following solvents are particularly suitable.

aliphatic hydrocarbons with 5 to 15 carbon atoms, such as hexane or heptane, for example, cycloaliphatic hydrocarbons with 5 to 12 carbon atoms, such as cyclohexane or cyclooctane, for example, monounsaturated or polyunsaturated, non-aromatic hydrocarbons which can be cyclic or acylic and have 5 to 15 carbon atoms, such as 1,3-hexadiene, dipentene, limonene, 1,5-cyclooctadiene and 1,3,5-cyclododecatriene.

In addition, mixtures of the hydrocarbons just mentioned with aromatics having 6 to 15 carbon atoms, such as toluene or xylene, for example, as well as with aliphatic ethers with up to 10 carbon atoms, such as methyl ethers or tert.-butyl ethers, are also suitable.

The thermoplastic which contains PPE, which can be present in granulate form, as a molded part or as a semifinished product, is first treated with a solution of an SBR and/or SBS rubber in the solvents just listed. The concentration of the solution is not critical. Usually, it is between 5 and 20 percent by volume; the concentration of the solution can also be so great that it has the consistency of a paste.

After treatment of the thermoplastic with the rubber solution, the greater part of the solvent is usually removed, for example, by evaporation. The mass obtained in this way can, if necessary, be treated once more or several times more with the rubber solution. Alternatively, the thermoplastic can also be treated with an aqueous latex of an SBR and/or SBS rubber, and the water can subsequently be removed.

The mass obtained has a very sticky surface in many cases, after treatment with the rubber solution of the latex. It can therefore be advantageous to treat the mass with a powdered SBR rubber which contains filler, i.e. to powder it, in order to simplify processing.

Finally, the powdered or unpowdered mass is covulcanized with component D.

For covulcanization, the usual vulcanizers, which are well known, particularly sulfur, should be present. It is preferable if the rubber D already contains these agents.

The optimum covulcanization conditions depend on the rubber mixture selected, in particular on its vulcanization system, and the shape of the molded part. For details, we refer to the book by W. Hofmann, op. cit., page 255 ff. In this book, the mixtures of diene rubbers with stearic acid, zinc oxide, fillers (e.g. carbon black), plasticizer oils as well as vulcanization activators which are preferred for use are also indicated. In particular, vulcanization activators which contain sulfur are used.

Other features of the invention will become apparent in the course of the following descriptions of exemplary embodiments which are given for illustration of the invention and are not intended to be limiting thereof.

EXAMPLES

Components used:

1. PPE Material (Component A)—Poly(2,6-dimethyl-1,4-phenylene ether) with a J value of 68 ml/g.

The polyphenylene ether is obtained by oxidative coupling of 2,6-dimethylphenol, stopping of the reaction and subsequent reaction extraction according to DE-OS No. 33 13 864 and OS No. 33 23 777. The solvent is removed by evaporation and the melt is extruded in a degasification extruder and subsequently granulated.

2. Natural Rubber (Component D)

A natural rubber as described in the handbook Encyclopedia of Polymer Science and Technology, Interscience Publishers New York, 1970, in Volume 12, page 191, Table 5, column 1, is used.

3. Adhesion Agent (Components B and C)

(3.1) A solution of 10 g of the E-SBR rubber BUNA EM 1502 in 100 cm$^3$ hexane. The properties of this type of rubber can be found in the company brochure of Chemische Werke Huls, No. 5214, dated October 1983, "BUNA EM Rubber Powder with Filler".

(3.2) A solution or suspension which is obtained by boiling 10 g of a dryblend of the following constituents in 100 cm$^3$ hexane for one hour:

| Parts by Weight | Material |
|---|---|
| 160 | rubber powder, consisting of 100 parts E-SBR rubber and 60 parts carbon black |

-continued

| Parts by Weight | Material |
|---|---|
|  | (company brochure of Chemische Werke Huls, No. 5214 dated October 1983 "BUNA EM Rubber Powder with Filler" |
| 1 | stearic acid |
| 4 | zinc oxide |
| 1 | N—isopropyl-N'—phenyl-p-phenylene diamine |
| 1 | N—(1,3-dimethylbutyl)-N'—phenyl-p-phenylene diamine |
| 2.5 | a commercially available protectant against aging caused by light and ozone (Antilux ® 111). This is a paraffin wax with a broad molecular weight distribution and a high molecular weight average. (Manufacturer: Dahleke, D-2070 Arensburg) |
| 1.8 | sulfur |
| 1.3 | N—cyclohexyl-1-benzothiazole sulfenamide- |
| 0.8 | tetramethyl thiuramide sulfide |
| 0.5 | diphenyl guanidine |
| 0.3 | zinc diethyl dithiocarbamate |

(3.3) A solution of 10 g Cariflex TR 1102 in 100 cm$^3$ cyclododecatriene. This is a styrene-butadienestyrene block copolymer with a 30% styrene proportion from Shell AG.

4. Powder

A dryblend as in 3.2.

Production of the Test Samples

Plates produced by injection molding from the PPE material according to 1. are coated with the rubber solution, subjected to a temperature of 60° C. with fresh air circulation for 15 minutes, if necessary, dusted with as much powder as adheres to them, covered with a rubber plate and vulcanized under pressure at 141° C. for 30 minutes. In order to allow separate attachment of the rubber layer and the PPE layer in the jaws of the tension device, a thin aluminum foil was placed between the rubber layer and the PPE layer at one end of the plate, before vulcanization.

Determination of Adhesion Strength

The determination is carried out based on DIN 53 531 and 53 539, with the difference that the width of the sample strip is 30 instead of 25 mm and that a pulling velocity of 100 instead of 50 mm/min is used.

Results

| Example | Adhesion Agent | Powder | Adhesion Force (N) |
|---|---|---|---|
| A | — | — | 12 |
| 1 | 3.1 | — | 133 |
| 2 | 3.2 | — | 165 |
| 3 | 3.1 | 4 | 122 |
| 4 | 3.2 | 4 | 225 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A composite part of firmly bonded molding materials, comprising:
   (A) a layer of thermoplastic material comprising polyphenylene ether,
   (B) a layer of SBR or SBS rubber or a mixture thereof surrounding said thermoplastic material; and
   (D) a layer of NBR or NR rubber, wherein said rubber is in contact with and is covulcanized with said layer of SBR or SBS rubber.

2. The composite part of claim 1, further comprising (C) an intermediate layer between (B) and (D) comprising a powdered SBR rubber.

3. The composite part of claim 2, wherein said component (C) further comprises a filler.

4. The composite part of claim 2, wherein said powdered rubber has a grain size below 1.0 mm.

5. The composite part of claim 1, wherein said thermoplastic material comprises polyphenylene ether and a member selected from the group consisting of polyalkylenes and styrene polymerizates.

6. The composite part of claim 1, wherein said thermoplastic material further comprises an additive selected from the group consisting of stabilizers, processing agents, reinforcers, foaming agents, metal fibers, carbon black, graphite, metal flakes, titanium oxide, zinc sulfide, carbon fibers, aramide fibers and mineral substrates.

7. The composite part of claim 1, wherein said thermoplastic material further comprises a flame-proofing agent.

8. The composite part of claim 1, wherein component (D) is a NR rubber.

* * * * *